United States Patent [19]

Kondo

[11] Patent Number: 5,059,076
[45] Date of Patent: Oct. 22, 1991

[54] READJUSTMENT PREVENTING STRUCTURE FOR ADJUSTMENT MEMBER

[75] Inventor: Yutaka Kondo, Obu, Japan

[73] Assignee: Aisan Kogyo Kabushiki Kaisha, Ohbu, Japan

[21] Appl. No.: 544,959

[22] Filed: Jun. 28, 1990

[51] Int. Cl.⁵ .............................................. F16B 19/00
[52] U.S. Cl. ................................ 411/377; 411/372; 411/373; 411/430; 411/909
[58] Field of Search ............... 411/372, 373, 377, 375, 411/430, 431, 909, 910

[56] References Cited

U.S. PATENT DOCUMENTS

| | | | |
|---|---|---|---|
| 1,119,654 | 12/1914 | Stafford | 411/372 |
| 1,293,367 | 2/1919 | Dodds | 411/372 |
| 1,478,028 | 12/1923 | Decker | 411/909 X |
| 3,457,823 | 7/1969 | Dillon | 411/373 X |
| 3,585,900 | 6/1971 | Chaivre | 411/430 |
| 4,316,690 | 2/1982 | Voller | 411/377 |
| 4,320,693 | 3/1982 | Benjamin | 411/377 X |
| 4,611,379 | 9/1986 | Heitzman | 411/372 X |
| 4,621,230 | 11/1986 | Crouch et al. | 411/373 X |
| 4,764,070 | 8/1988 | Baltzell et al. | 411/372 X |
| 4,923,348 | 5/1990 | Carlozzo et al. | 411/377 |

FOREIGN PATENT DOCUMENTS

| | | | |
|---|---|---|---|
| 2845492 | 4/1980 | Fed. Rep. of Germany | 411/373 |
| 2383352 | 10/1978 | France | 411/373 |
| 2595125 | 9/1987 | France | 411/373 |
| 50-35540 | 2/1974 | Japan . | |

Primary Examiner—Robert L. Wolfe
Assistant Examiner—Suzanne L. Dino
Attorney, Agent, or Firm—Cushman, Darby & Cushman

[57] ABSTRACT

A structure for preventing from readjusting an adjustment member, which adjusts an extent of operation by rotating the adjustment member, and more particularly, for preventing from readjusting an adjustment member in a carburetor. The structure for the adjustment member includes a hollow tube of a heat shrinkable resin to be fitted around the outer surface of a rotating operational portion of the adjustment member in such a manner that when the hollow tube is heated to be shrunk, it is securely fixed around the outer surface of the adjustment operational portion. Owing to such an arrangement, it will be impossible to fit a tool or the like onto the adjustment operational portion of the adjustment member once it has been available to the user, thus preventing the readjustment. Even if it is readjusted, the readjustment will be easily recognized during a particular inspection of performance. Besides, a special cap like this is difficult to obtain, thereby preventing the user from disguising the adjustment member by installing a new one after destroying the original cap and conducting the readjustment.

15 Claims, 2 Drawing Sheets

READJUSTMENT PREVENTING STRUCTURE FOR ADJUSTMENT MEMBER

BACKGROUND OF THE INVENTION

The present invention relates to a readjustment preventing structure for an adjustment member and, more particularly, to a readjustment preventing structure for an adjustment member in a carburetor.

In an apparatus including an adjustment member or a carburetor in particular, there are conventionally provided various adjustment screws such as an opening regulation screw for a throttle valve or an auto-choke valve so that a ratio, e.g. an air fuel ratio, a suction air amount and the like, can be adjusted to optimum values by these adjustment screws before the apparatus is supplied to the market.

If the adjustment screws are tampered with by the user, the air fuel ratio, the suction air amount and the like which have been preset will be changed to induce incomplete combustion of the fuel, thereby resulting in such a problem as atmosphere pollution.

As conventional means for preventing the user's readjustment, an engagement slot has been formed on the outer periphery of a head for rotating operation of an adjustment screw, and a projection to be engaged in this engagement slot has been also formed on an inner peripheral portion of an elastic cap. Thus, after adjusting the adjustment screw, the cap is press-fitted onto the head of the adjustment screw while causing the projection to be engaged in the engagement slot, so that the cap will be rotatably put on the head, and that the head cannot be rotated. An example of such means is disclosed in Japanese Patent Unexamined Publication No. 50-35540.

In addition, as simple preventing means, seal paint is applied to the outer surface of a head of an adjustment screw in order to check whether or not the adjustment screw has been readjusted.

SUMMARY OF THE INVENTION

In case of the conventional preventing means of the cap described above, the special adjustment screw with the engagement slot formed on its head and the special cap with the projection formed on its inner peripheral portion are required. Further, in case of the above conventional preventing means of the seal paint, readjustment cannot be recognized if the user removes the seal paint by means of fat and oil and applies paint to the adjustment screw again after readjusting it, and also, degradation of the seal paint makes it difficult to recognize the readjustment.

An object of the present invention is to provide a readjustment preventing structure which does not require any special adjustment screw so that it can be applied to an ordinary adjustment screw, and that it can effect prevention of the readjustment simply and inexpensively.

In order to solve the above-described problems, the present invention provides a readjustment preventing structure for an adjustment member for adjusting an extent of operation by rotating it, wherein it includes a hollow tube of a heat shrinkable resin to be fitted around the outer surface of a rotating operational portion of the adjustment member in such a manner that when the hollow tube is heated to be shrunk, it is securely fixed around the outer surface of the adjustment operational portion.

For adjusting the adjustment member in the factory before supplying it to the market, the adjustment member is set at a predetermined fixed position by rotating its rotating operational portion with a tool. After the adjustment member has been once set, a cap in the form of the hollow tube is fitted on the outer peripheral surface of the rotating operational portion, and the cap is heated in this state. Due to the heat, the cap will be shrunk and press-fitted around the adjustment operational portion, while closely covering it. When the adjustment member covered in this manner is supplied to the market, it will be impossible to fit a tool or the like onto the adjustment operational portion of the adjustment member which is available to the user, thereby preventing the readjustment.

Moreover, even if the adjustment member on the market is readjusted through the outer surface of the cap by means of a tool or the like, the readjustment can be recognized at a glance during an inspection of performance because operational scars by the tool remain on the outer surface of the cap.

Furthermore, since the cap is made of the heat shrinkable hollow tube having a predetermined diameter, such a special cap is difficult to obtain in the market, thereby preventing the user from disguising the adjustment member by a new cap after destroying the original cap and conducting the readjustment.

Besides, in case that the adjustment member is to be readjusted during the inspection in the factory, the cap can be torn and replaced with a new one quite easily.

DETAILED DESCRIPTION OF THE PREFERRED EMBODIMENTS

Figure 1:
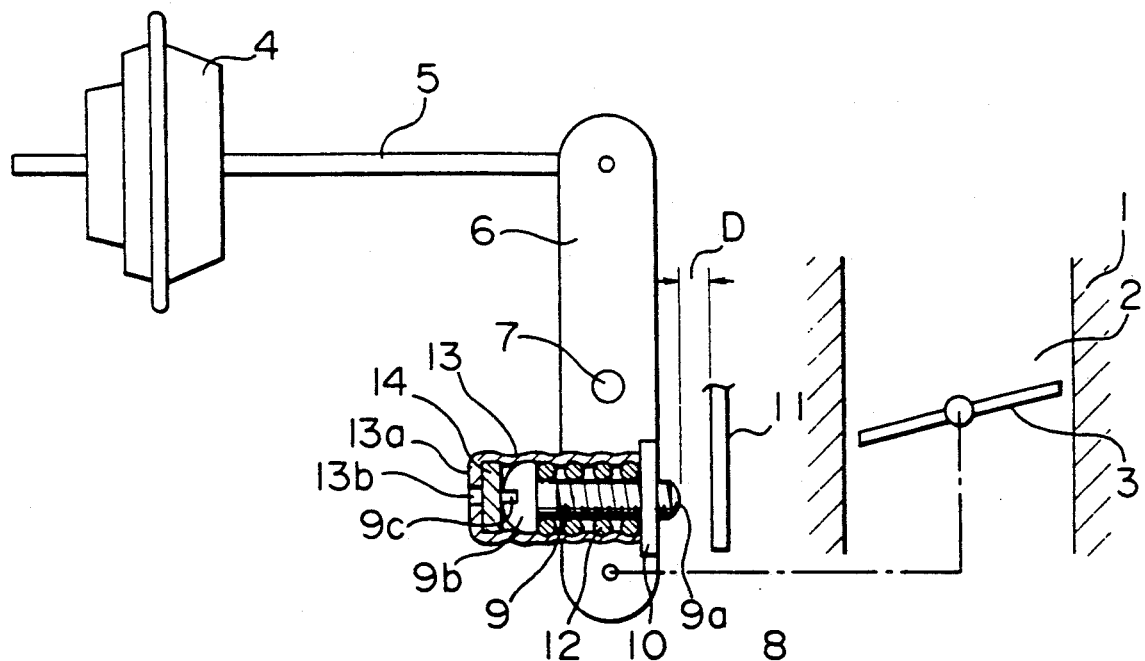
FIG. 1 is a partially sectional side view showing one embodiment of the present invention, which is applied to an opening regulation mechanism for a throttle valve in a carburetor.
Figure 2:
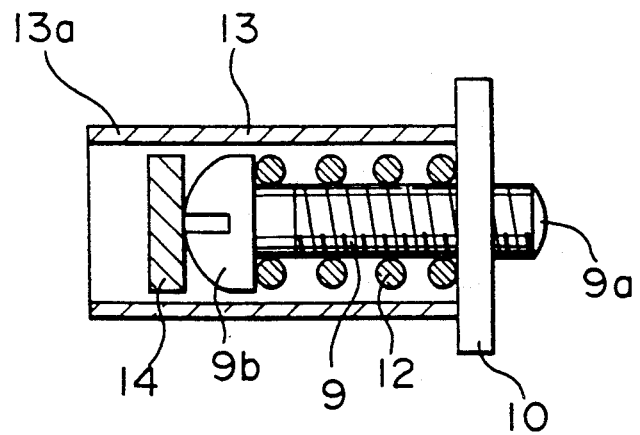
FIG. 2 is a sectional side view showing a condition of a cap before it is heated in the same embodiment.

FIGS. 1 and 2 show a first embodiment of the present invention applied to an opening adjustment screw for a throttle valve in a carburetor. In this embodiment, reference numeral 1 denotes a main body of the carburetor, 2 an air suction passage, and 3 the throttle valve. Reference numeral 4 is a vacuum actuator, a rod 5 of which is moved back and forth (right and left in FIG. 1) in response to a change of pressure depression of suction air introduced into this actuator, and an operating lever 6 connected to the distal end of the rod 5 is moved swinging around a fulcrum pin 7, so that the opening of the throttle valve 3 is controlled through a cooperation linkage mechanism 8. Reference numeral 9 is the adjustment screw fitted into a mount plate 10 of the operating lever 6 and extending tangential to a direction of rotation of the operating lever 6. A contact end 9a of the adjustment screw 9 projects from the mount plate 10 in the same direction as advance of the operating lever 6 when it is operated to open the valve. When a head 9b with a slot of the adjustment screw 9 is rotated in normal and reverse directions, the adjustment screw 9 is moved back and forth, and accordingly, it is possible to adjust an extent of projection of the contact end 9a from the mount plate 10. Reference numeral 11 represents a stopper for the adjustment screw 9, which is securely fixed on the main body of the carburetor 1 so that it confronts the contact end 9a of the adjustment screw 9 at a predetermined distance D. Reference numeral 12 is a locking spring compressed and interposed between the head 9b of the adjustment screw 9 and the mount plate 10.

Reference numeral 13 denotes a readjustment preventing cap made of a heat shrinkable resin which will be shrunk when it is heated. As shown in FIG. 2, this cap before heating is a hollow tube whose inner diameter is slightly larger than the outer diameter of the head 9b of the adjustment screw 9 and whose axial length is larger than a distance between the mount plate 10 and the head 9b of the adjustment screw 9. Reference numeral 14 denotes a plate for covering an operation slot 9c of the head 9b, which is formed as a disk having the same outer diameter as that of the head 9b.

In this embodiment, after the adjustment screw 9 is rotated to adjust the distance D between the contact end 9a thereof and the mount plate 10 to a predetermined value, the hollow cap 13 is fitted on the adjustment screw 9 and the outer periphery of the spring 12 so as to bring its rear end into contact with the mount plate 10, as shown in FIG. 2, and the plate 14 is then inserted into the cap 13 through a front end opening thereof in order to be in contact with the head 9b. After that, the cap 13 is heat-shrunk by hot air of a dryer or the like. Thus, as shown in FIG. 1, the body of the cap 13 is shrunk while filling in gaps between coils of the spring 12 and closely fitted around the head 9b and the spring 12, and also, an excessive portion 13a of the cap 13 projecting from the plate 14 is superposed and shrunk on the front surface of the plate 14 and closely fitted on the plate 14, thereby reliably preventing detachment of the cap 13. Even if a gap 13b is formed on the front surface of the shrunk cap 13, as shown in FIG. 1, the operation slot 9c of the head 9b will be still covered with the plate 14.

Figure 3:
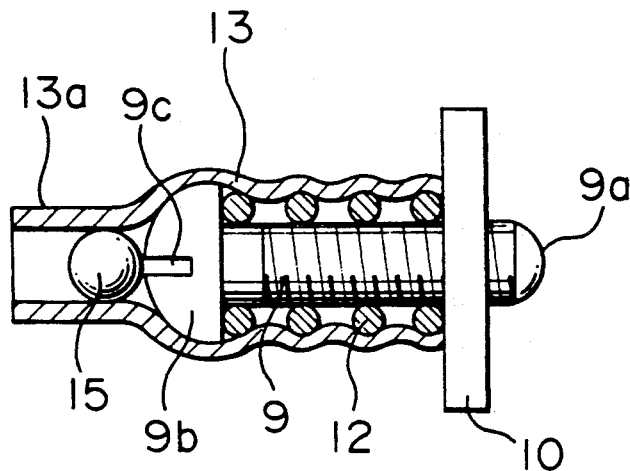
FIGS. 3 to 5 are sectional side views showing three other embodiments of the present invention, respectively.

FIG. 3 shows a second embodiment of the present invention in which a steel ball 15 is employed in place of the plate 14 in the first embodiment. After the cap 13 is fitted around the adjustment screw 9, the steel ball 15 is inserted into the cap 13, and then, the cap 13 is heat-shrunk. Since the other parts of the structure are identical with those of the first embodiment described above, they are denoted by the common reference numerals so that explanation thereof may be omitted.

Figure 4:
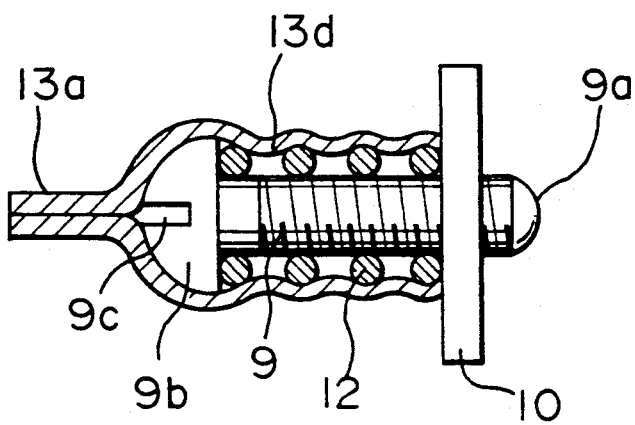

FIG. 4 shows a third embodiment of the present invention. Adhesive is applied to the inner surface of the excessive portion 13a of the cap 13 used in the first embodiment, and such a cap 13d is employed in the third embodiment. After the cap 13d is fitted around the adjustment screw 9 and heat-shrunk, the excessive portion 13a is adhered and sealed by pressing it while heating it. Since the other parts of the structure are identical with those of the first embodiment described above, they are denoted by the common reference numerals so that explanation thereof may be omitted.

Figure 5:
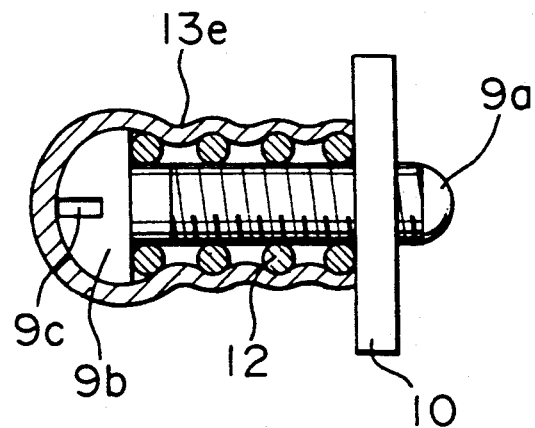

FIG. 5 shows a further embodiment of the present invention in which a cap 13e of a hollow tube with one end closed is employed in place of the cap 13 in the first embodiment. After this cap is fitted onto the adjustment screw 9 from its open end, it is heat-shrunk. In this embodiment, the operation slot 9c can be covered with the bottom wall of the cap 13e. Since the other parts of the structure are identical with those of the first embodiment described above, they are denoted by the common reference numerals so that explanation thereof may be omitted.

Additionally, the structure according to the invention can be applied to a throttle body, LPG mixing device, etc. as well as to the carburetor as described in the above embodiments.

What is claimed is:

1. A readjustment preventing structure for an adjustment member having a locking spring, the adjustment member for adjusting an extent of operation by rotating it, wherein the readjustment preventing structure includes a hollow tube of a heat shrinkable resin to be fitted around the outer surface of the locking spring and a part of an outer surface in a rotating operation portion of the adjustment member in such a manner that when the hollow tube is heated to be shrunk, it is securely fixed around the outer surface of the locking spring and the part of the outer surface in the adjustment operational portion.

2. A readjustment preventing structure for an adjustment member according to claim 1, wherein a cap is formed by heating said hollow tube fitted around the outer surface of the locking spring and the part of the outer surface in said rotating operation portion of the adjustment member and shrinking and securely fixing it around said outer surface.

3. A readjustment preventing structure for an adjustment member according to claim 1, wherein said readjustment preventing structure further includes a plate provided within said hollow tube so as to cover a head of said operational portion, and an outer diameter of said plate is substantially equal to that of said head of the operational portion.

4. A readjustment preventing structure for an adjustment member according to claim 1, wherein said readjustment preventing structure further includes a steel ball provided within said hollow tube so as to cover a head of said operation portion, and an outer diameter of said steel ball is substantially equal to that of said head of the operational portion.

5. A readjustment preventing structure for adjustment member according to claim 1, wherein adhesive is applied to the inner surface of an excessive portion of said hollow tube so that after said hollow tube fitted around the outer surface of the locking spring and the part of the outer surface in said rotating operational portion has been heat-shrunk, said excessive portion is adhered and sealed by pressing it while heating it.

6. A readjustment preventing structure for an adjustment member according to claim 1, wherein said hollow tube is a hollow cylindrical member with one end closed.

7. A readjustment preventing means for an adjustment member of a carburetor, wherein the rotation of the adjustment member controls the power output of the carburetor, the readjustment preventing structure comprising:
   a locking spring; and
   a heat-shrinkable cover means to be fitted around the outer surface of the locking spring and a part of an outer surface of the adjustment member in such a manner that when the heat-shrinkable cover means is heated to be shrunk, it is securely fixed around the outer surface of the locking spring and the part of the outer surface of the adjustment member.

8. A readjustment preventing means as in claim 1, further comprising a plate placed within said heat-shrinkable cover means so as to cover the top of said adjustment member.

9. A readjustment preventing means as in claim 1, further comprising a steel ball placed within said heat-shrinkable cover means so as to cover the top of said adjustment member.

10. A readjustment preventing means as in claim 1, said heat-shrinkable cover means comprising a hollow cylindrical member with one end closed.

11. A readjustment preventing method for an adjustment member of a carburetor, wherein the rotation of the adjustment member controls the power output of the carburetor, the readjustment preventing method comprising:

placing a locking spring about the adjustment member;

placing a heat-shrinkable cover means to be fitted around the outer surface of the locking spring and the top part of the adjustment member; and heating the heat-shrinkable cover means so that it will be securely fixed around the outer surface of the locking spring and a part of the top part of the adjustment member.

12. A readjustment preventing method as in claim 11, the heating step including the step of forming a cap around the top of the outer surface of said adjustment member.

13. A readjustment preventing method as in claim 11, further comprising, after placing said locking spring and prior to placing said heat-shrinkable cover means, the step of placing a plate within said heat-shrinkable cover means so as to cover the top of the adjustment member.

14. A readjustment preventing method as in claim 11, further comprising, after placing said locking spring and prior to placing said heat-shrinkable cover means, the step of placing a steel ball within said heat-shrinkable cover means so as to cover the top of the adjustment member.

15. A readjustment preventing method as in claim 11, further comprising, after placing said heat-shrinkable cover means and prior to heating said heat-shrinkable cover means, the step of applying adhesive to the inner surface of the top of said heat-shrinkable cover means, so that after said heat-shrinkable cover means is heat-shrunk, the top of said heat-shrinkable means is sealed.

* * * * *